United States Patent [19]
Ohtaka

[11] Patent Number: 5,729,771
[45] Date of Patent: Mar. 17, 1998

[54] FOCUS DETECTING APPARATUS AND OPTICAL APPARATUS USING IT

[75] Inventor: Keiji Ohtaka, Yokohama, Japan

[73] Assignee: Canon Kabushiki Kaisha, Tokyo, Japan

[21] Appl. No.: 588,420

[22] Filed: Jan. 18, 1996

[30] Foreign Application Priority Data

| Jan. 20, 1995 | [JP] | Japan | 7-026058 |
| Mar. 28, 1995 | [JP] | Japan | 7-069625 |

[51] Int. Cl.⁶ .................. G03B 13/00; G03B 13/34
[52] U.S. Cl. ............................. 396/113; 396/121
[58] Field of Search .......................... 396/121–123, 396/111–114, 89

[56] References Cited

U.S. PATENT DOCUMENTS

| 4,634,255 | 1/1987 | Suda et al. | 354/406 |
| 4,688,920 | 8/1987 | Suda et al. | 354/406 |
| 4,728,785 | 3/1988 | Ohnuki et al. | 250/201 |
| 4,774,539 | 9/1988 | Suda et al. | 354/406 |
| 4,792,669 | 12/1988 | Ohnuki et al. | 250/201 |
| 4,825,239 | 4/1989 | Suda et al. | 354/402 |
| 4,841,326 | 6/1989 | Koyama et al. | 354/406 |
| 4,849,782 | 7/1989 | Koyama et al. | 354/408 |
| 4,859,842 | 8/1989 | Suda et al. | 250/201 |
| 4,954,701 | 9/1990 | Suzuki et al. | 250/201.8 |
| 4,959,677 | 9/1990 | Suda et al. | 354/402 |
| 4,992,817 | 2/1991 | Aoyama et al. | 354/403 |
| 4,992,819 | 2/1991 | Ohtaka et al. | 354/408 |
| 5,005,041 | 4/1991 | Suda et al. | 354/407 |
| 5,257,062 | 10/1993 | Moriyama | 354/408 |
| 5,258,804 | 11/1993 | Suda | 354/406 |
| 5,532,781 | 7/1996 | Utagawa et al. | 354/402 |
| 5,565,956 | 10/1996 | Kusaka | 396/114 |

FOREIGN PATENT DOCUMENTS 7-62735   7/1995   Japan.

*Primary Examiner*—Safet Metjahic
*Assistant Examiner*—Eric Nelson
*Attorney, Agent, or Firm*—Fitzpatrick, Cella, Harper & Scinto

[57] ABSTRACT

The present invention relates to a focus detecting apparatus comprising a field mask disposed near a prescribed image plane of an objective lens and having an aperture offset from the optical axis of the objective lens in order to restrict a field area. A field lens is disposed near the prescribed image plane of the objective lens with a pair of secondary imaging lenses corresponding to the aperture for reimaging an image formed by the objective lens. A stop is disposed adjacent to the pair of secondary imaging lenses and having a pair of apertures for restricting light passing through the pair of secondary imaging lenses. A senor for detecting light quantity; distributions of images formed by the secondary imaging lenses. The pair of secondary imaging lenses are in contact with each other and have different projection shapes on a plane perpendicular to the optical axis of the objective lens.

8 Claims, 14 Drawing Sheets

FOCUS DETECTING APPARATUS AND OPTICAL APPARATUS USING IT

BACKGROUND OF THE INVENTION

1. Field of the Invention

The present invention relates to a focus detecting apparatus in an optical apparatus. More particularly, the invention concerns an improvement in an optical system for constituting the focus detecting apparatus.

2. Related Background Art

There are a variety of focus detecting apparatus proposed as apparatus for detecting the focusing condition of an objective lens in a camera or the like, one of which is shown in FIG. 15. In FIG. 15, reference numeral 1 designates an objective lens, a field mask disposed near a prescribed focal plane of the objective 1, 3 a field lens also disposed near the prescribed focal plane, 4 a secondary imaging lens composed of two positive lenses 4-1, 4-2 arranged in symmetry with respect to the optical axis of the objective 1, 5 a sensor composed of two sensor arrays 5-1, 5-2 disposed behind the two lenses 4-1, 4-2 in correspondence thereto, and 6 a stop having two apertures 6-1, 6-2 disposed in correspondence to the two lenses 4-1, 4-2. Numeral 7 denotes exit pupils of the objective 1 composed of two separate areas 7-1, 7-2. The field lens 3 has a function to image the apertures 6-1, 6-2 near the areas 7-1, 7-2 of the exit pupils of the objective 1, and beams of object light having passed through the areas 7-1, 7-2 form respective light quantity distributions on the sensor arrays 5-1, 5-2.

In the case of the focus detecting apparatus shown in FIG. 15, when the image point of the objective 1 is located before the prescribed focal plane, the light quantity distributions each formed on the two sensor arrays 5-1, 5-2 become closer to each other; when the image point of the objective 1 is located behind the prescribed focal plane, the light quantity distributions each formed on the two sensor arrays 5-1, 5-2 become more distant from each other. Since an amount of deviation between the light quantity distributions each formed on the two sensor arrays 5-1, 5-2 is in a relation of a certain function with a defocus amount of the objective 1, a direction and an amount of defocus of the objective 1 can be detected by calculating the amount of deviation by a suitable arithmetic means, as is well known.

The focus detecting apparatus shown in FIG. 15 can measure a distance to only an object existing in the center of a range photographed by the objective 1 or observed through a view finder. In contrast with it, Japanese Patent Application No. 62-279835 (corresponding to U.S. Pat. No. 5,005, 041) discloses another focus detecting apparatus having not only a distance-measuring field in the center of the range photographed or observed, but also those in areas other than the center. FIG. 16 is a perspective view to depict an optical system of the apparatus, wherein numeral 8 denotes a field mask, 9 a field lens, 10 a stop having two apertures 10-1, 10-2, 11 a secondary imaging lens comprised of two positive lenses 11-1, 11-2, and 12 a sensor. The objective lens 1 shown in FIG. 15 is omitted herein, but it is located to the left of the drawing. This apparatus is different from the focus detecting apparatus shown in FIG. 15 in that the field mask 8 has a plurality of apertures 13–17 corresponding to a plurality of fields to be distance-measured and in that the sensor 12 includes plural pairs of sensor arrays 18-1 and 18-2, 19-1 and 19-2, 20-1 and 20-2, 21-1 and 21-2, 22-1 and 22-2 so as to receive plural pairs of light quantity distributions formed by the secondary imaging system 11 from light beams restricted by the field mask 8. The principle of distance measurement is the same as that by the focus detecting apparatus of FIG. 15, and focus is detected for each field by calculating an amount of deviation between light quantity distributions formed on each sensor pair. This focus detecting apparatus can measure a distance in the central portion of the range photographed or observed and those in four areas on either side thereof, thus distances in the five areas in total. The number of distance-measuring fields is not limited to this, but it may be determined by a number of apertures in the field mask and a number of sensor pairs.

The focus detecting apparatus shown in FIG. 16 is an improvement to overcome the drawback of the focus detecting apparatus of FIG. 15 that distance measurement is possible only for an object existing in the center of the range photographed or observed by the objective lens. However, because the focus detecting apparatus shown in FIG. 16 is arranged to vertically move the two light quantity distributions relative to each other on the sensor depending upon the focus condition of the objective, distance measurement is possible only for an object having a change of light quantity distribution substantially in the vertical direction. It was thus difficult for the focus detecting apparatus of FIG. 16 to perform distance measurement for an object having a change of light quantity distribution only in a direction perpendicular to the vertical direction, for example, such as white and black edge patterns with vertical lines as borders.

U.S. Pat. No. 5,258,804 discloses another focus detecting apparatus that solved the above problem. FIG. 17 is a drawing to show a configuration of the optical system.

In the drawing, numeral 31 represents a field mask, which has a cross aperture 31-1 in the center and vertically elongate apertures 31-2, 31-3 in peripheral areas on either side thereof. Numeral 32 stands for a field lens, which is composed of three parts 32-1, 32-2, 32-3 in correspondence to the three apertures 31-1, 31-2, 31-3 in the field mask. Numeral 33 designates a stop, which has vertical and horizontal pairs of apertures in the central portion, four apertures in total 33-1a, 33-1b, 33-1c, 33-1d, and two pairs of apertures in left and right peripheral areas, apertures 33-2a, 33-2b and 33-3a, 33-3b. Each area 31-1, 31-2, 31-3 in the field lens 32 has a function to focus an image of the associated aperture pair 33-1, 33-2, 33-3 near the exit pupil of the objective lens not shown. Numeral 34 is a secondary optical member integrally including a secondary imaging lens comprised of four pairs of positive lenses, eight lenses in total, 34-1a, 34-1b, 34-1c, 34-1d, 34-2a, 34-2b, 34-3a, 34-3b, which is disposed behind the stop 33 so that the lenses may correspond to the respective apertures in the stop 33. Numeral 35 represents a sensor comprised of four pairs of sensor arrays, eight sensor arrays in total 35-1a, 35-1b, 35-1c, 35-1d, 35-2a, 35-2b, 35-3a, 35-3b, which are located so as to receive images of the respective lenses in the secondary imaging lens in correspondence thereto.

FIG. 18 shows image areas formed on the sensor 35. In the drawing, 36-1a, 36-1b, 36-1c, 36-1d are image areas formed in such a manner that after a light beam having passed through the center aperture 31-1 of the field mask and the central area 32-1 of the field lens is restricted by the apertures 33-1a, 33-1b, 33-1c, 33-1d in the stop, light beams are focused on the sensor surface by the lenses 34-1a, 34-1b, 34-1c, 34-1d of the secondary imaging lens disposed behind the stop. Further, 36-2a, 36-2b represent image areas formed on the sensor in such a manner that after a light beam having passed through the peripheral aperture 31-2 of the field mask and the peripheral area 32-2 of the field lens is restricted by the apertures 33-2a, 33-2b in the stop, light beams are focused on the sensor by the lenses 34-2a, 34-2b of the secondary imaging lens behind the stop. Similarly, 36-3a, 36-3b represent image areas formed on the sensor surface in such a manner that after a light beam having passed through the peripheral aperture 31-3 of the field mask and the peripheral area 32-3 of the field lens is restricted by the apertures 33-3a, 33-3b in the stop, light beams are focused on the sensor surface by the lenses 34-3a, 34-3b of the secondary imaging system behind the stop.

The principle of distance measurement of the focus detecting apparatus shown in FIG. 18 is the same as that of the apparatus shown in FIG. 15, whereby relative positions of the images can be detected in the direction of the paired sensor arrays. Since the apparatus of FIG. 18 has the configuration as explained above, it can well measure the distance also for an object with a light quantity distribution changing only in one direction either vertically or horizontally near the center of the range photographed or observed by the objective lens (not shown). In addition, distance measurement is also possible for an object located corresponding to the peripheral aperture 31-2, 31-3 in the field mask away from the center.

The focus detecting apparatus shown in FIG. 16 or FIG. 17 enabled distance measurement (detection) not only in the center of the range (screen) photographed or observed by the objective lens, but also in a peripheral area of a screen apart left or right from the center. Further developing this, it is theoretically possible to enable distance measurement in a peripheral area apart up or down from the center, though problems could occur as to how to guide a light beam for distance measurement thereto, the arrangement, and the space.

For example, by rotating the peripheral field of the focus detecting apparatus of FIG. 17 90° about the optical axis passing through the center of the system and locating it so as not to interfere with the system before rotation, a focus detecting apparatus can be constructed with a distance-measuring field as shown in FIG. 19. If the angle of rotation on that occasion is set to an angle other than 90°, for example to ±45°, a focus detecting apparatus can relatively easily be realized with distance-measuring (detecting) fields inclined and located at positions apart obliquely from the center, as shown in FIG. 20.

However, focusing with the distance-measuring fields obliquely inclined relative to the rectangular screen, as shown in FIG. 20, would lack a feeling of stability and would not be so easy for a user to handle. Considering that many normal objects are composed of vertical lines and horizontal lines, it is to be desired that in the case wherein the apparatus also has distance-measuring fields at positions obliquely apart from the center of the screen, the direction of the fields be parallel to the edges of the screen, for example, as shown in the distance-measuring fields of FIG. 21 and FIG. 22.

Since these focus detecting apparatus cannot be constructed simply by rotating the optical system, as explained above, conventional ideas for focus detecting systems cannot be applied as they are.

SUMMARY OF THE INVENTION

An object of the present invention is to provide a focus detecting apparatus having a spread of fields parallel to the edges of a screen with centers thereof at positions obliquely apart from the center of the screen, as shown in FIG. 21 or FIG. 22. More desirably, an object of the invention is to provide a compact and high-precision focus detecting system that eliminates or relaxes a difference in imaging performance between two images due to asymmetry of two paired secondary imaging systems.

A focus detecting apparatus of the present invention comprises a field mask disposed near a prescribed image plane of an objective lens and having an aperture offset from the optical axis of the objective lens in order to restrict a field area; a field lens also disposed near the prescribed image plane of the objective lens; a pair of secondary imaging lenses corresponding to the aperture, for re-imaging an image formed by the objective lens; a stop disposed adjacent to the pair of secondary imaging lenses and having a pair of apertures for restricting light passing through the pair of secondary imaging lenses; and a sensor for detecting light quantity distributions of images formed by the secondary imaging lenses; wherein the pair of secondary imaging lenses are in contact with each other and have different projection shapes on a plane perpendicular to the optical axis of the objective lens.

In a preferred form of the focus detecting apparatus of the present invention, when centers of the paired apertures on the stop and apexes of the pair of secondary imaging lenses corresponding to the paired apertures on the stop are projected onto the plane perpendicular to the optical axis of the objective lens, relative positional relations therebetween are not coincident with each other and a separation between the centers of the paired apertures on the stop is different from a separation between the apexes of the pair of secondary imaging lenses.

In another preferred form of the focus detecting apparatus of the present invention, the paired apertures on the stop corresponding to the aperture of the field mask have different areas and/or shapes from each other.

In another preferred form of the focus detecting apparatus of the present invention, the secondary imaging lenses have an optical member for relaxing an optical pathlength difference between light beams passing through the respective lenses and for relaxing a change of angle due to refraction, of either one of a beam of rays incident into each lens and a beam of rays emerging from each lens.

In a further preferred form of the focus detecting apparatus of the present invention, the optical member is a prism member provided either on an entrance surface or on an exit surface of the pair of secondary imaging lenses, the prism member comprising a plane determined by a normal vector having components in a longitudinal direction of the aperture of the field mask and in a direction perpendicular to the longitudinal direction, wherein regions of the prism member corresponding to the pair of secondary imaging lenses are not on the same plane.

An optical apparatus of the present invention is characterized by having the focus detecting apparatus as described above.

DETAILED DESCRIPTION OF THE PREFERRED EMBODIMENTS

Figure 1:
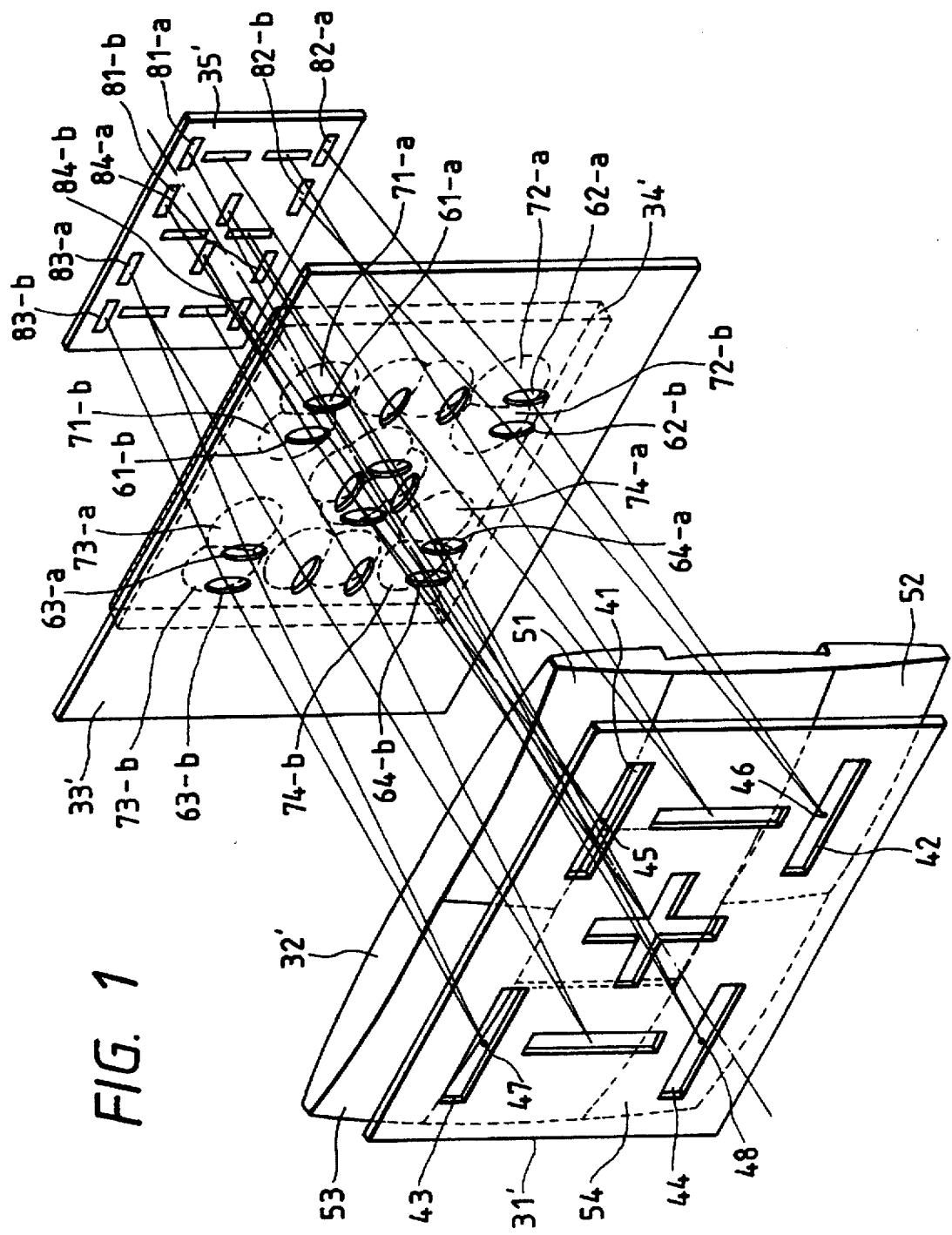
FIG. 1 is a schematic drawing to show the main part of a first embodiment of the focus detecting apparatus according to the present invention.

FIG. 1 is a drawing to show an embodiment of the present invention. The basic configuration of the field mask, field lens, stop, secondary imaging lens, and sensor is the same as that of the focus detecting system shown in FIG. 17, but is different in the following points.

Namely, the field mask 31' has four additional apertures 41, 42, 43, 44 horizontally extending at positions obliquely apart from the center, and in correspondence thereto, the field lens 32' has four areas 51, 52, 53, 54, the stop 33' four pairs of apertures 61-a and 61-b, 62-a and 62-b, 63-a and 63-b, 64-a and 64-b, the secondary optical member 34' four pairs of lenses 71-a and 71-b, 72-a and 72-b, 73-a and 73-b, 74-a and 74-b, and the sensor 35' four pairs of sensors 81-a and 81-b, 82-a and 82-b, 83-a and 83-b, 84-a and 84-b. The stop 33' may be located either ahead or behind the secondary imaging lens, and each pair of sensors may be replaced by a single sensor array as partitioned into two parts when used.

Figure 17:
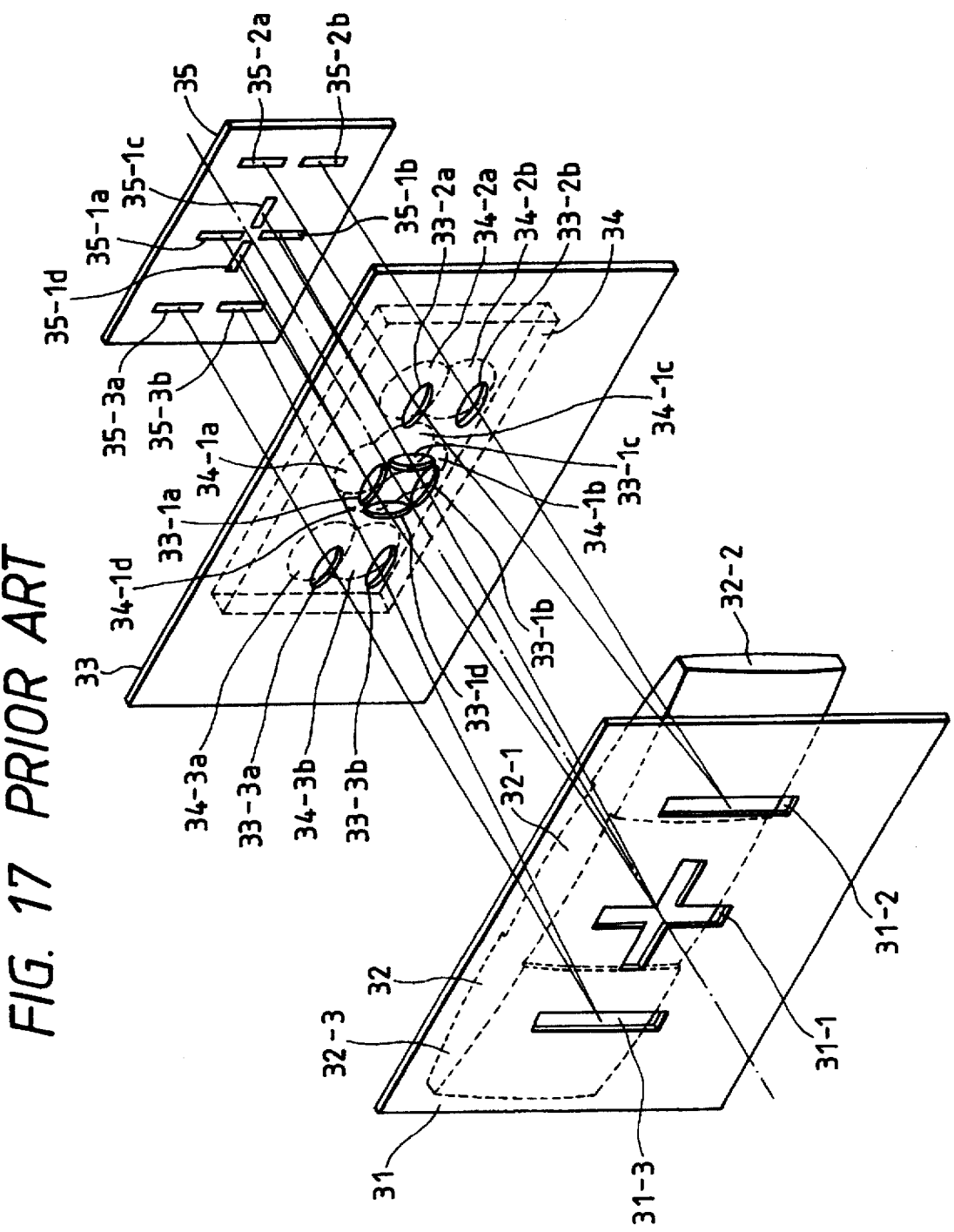
FIG. 17 is a drawing to illustrate yet another conventional example.
Figure 18:
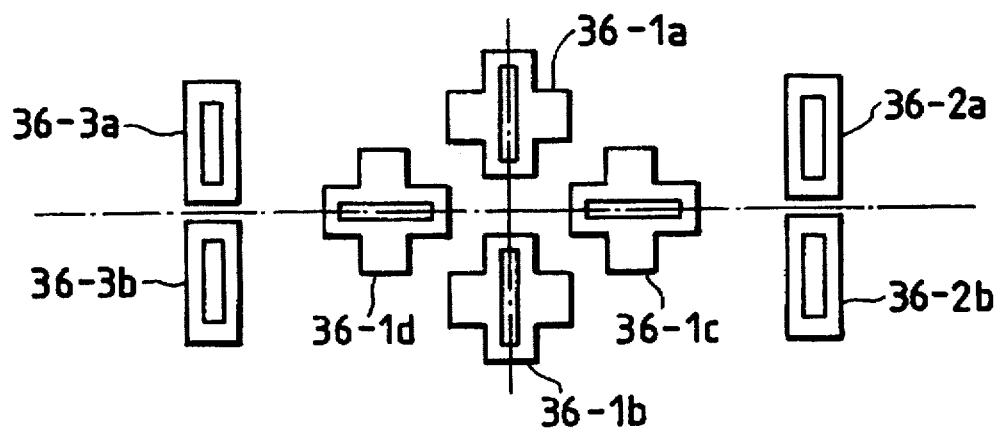
FIG. 18 is a drawing to illustrate the conventional example.
Figure 19:
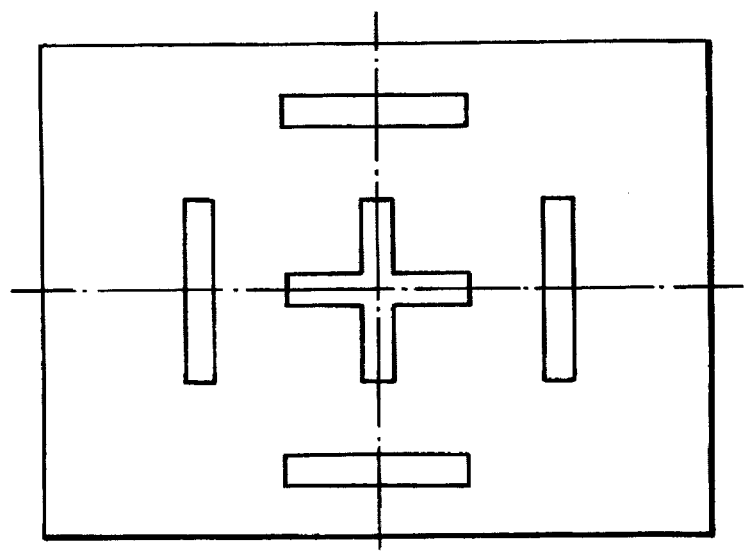
FIG. 19 is a drawing to illustrate an object for use with the invention.
Figure 20:
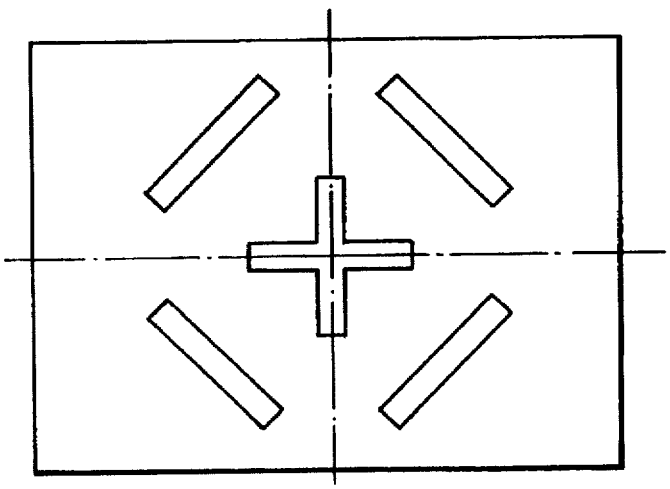
FIG. 20 is a drawing to illustrate another object for use with the invention.
Figure 21:
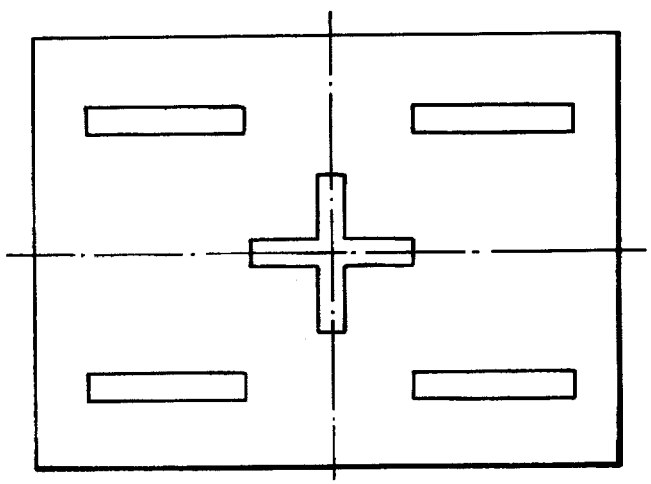
FIG. 21 is a drawing to illustrate yet another object for use with the invention.
Figure 22:
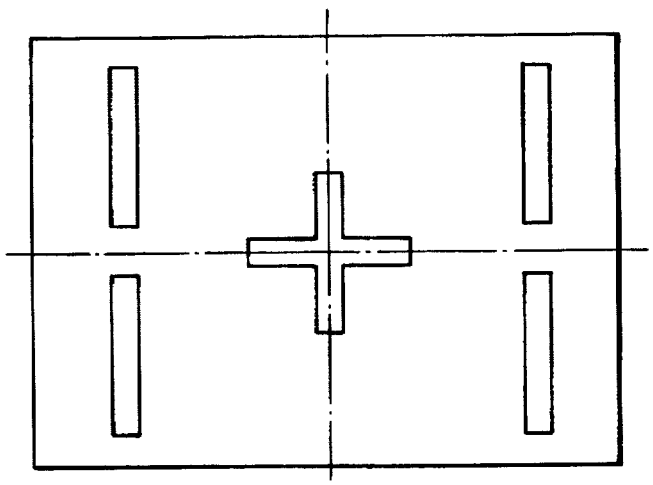
FIG. 22 is a drawing to illustrate still another object for use with the invention.

In this arrangement, as explained in the description of FIG. 17, each area 51, 52, 53, 54 in the field lens 32' has a function to image an aperture pair 61-a and 61-b, 62-a and 62-b, 63-a and 63-b, 64-a and 64-b in the stop 33' near the exit pupil of the objective not shown (which is located to the left of the drawing). Light passing through the aperture pairs in the stop is focused by the individual lens pairs 71-a and 71-b, 72-a and 72-b, 73-a and 73-b, 74-a and 74-b to form light quantity distributions as to secondary images of an object on the sensor pairs 81-a and 81-b, 82-a and 82-b, 83-a and 83-b, 84-a and 84-b.

It is thus presumable from a comparison with the conventional focus detecting apparatus that the above arrangement theoretically enables focus detection in the distance-measuring fields 41, 42, 43, 44 located obliquely apart from the center, but these distance-measuring fields are different from the conventional distance-measuring fields 31-1, 31-2, 31-3 shown in FIG. 17 in that the spreading directions of the distance-measuring fields of the present embodiment (the horizontal directions in the present embodiment) are not perpendicular to a plane including the optical axis of the objective (not shown) and passing the center 45, 46, 47, 48 of each distance-measuring field.

Because of this difference, it is desirable, regarding optical characteristics, that the constituent elements of the focus detecting system be arranged in a different structure from those of the conventional systems.

Figure 2:
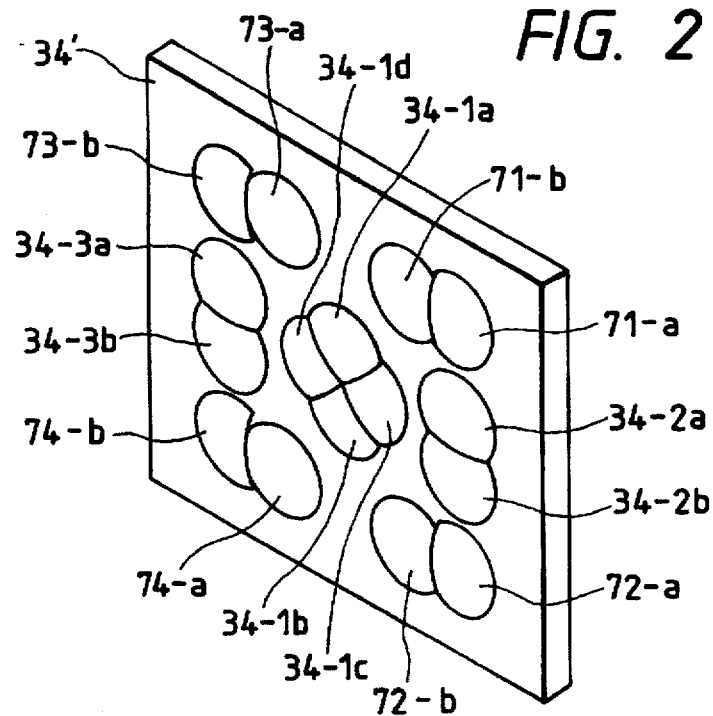
FIG. 2 is a perspective view of a secondary imaging optical member in Embodiment 1.
Figure 3:
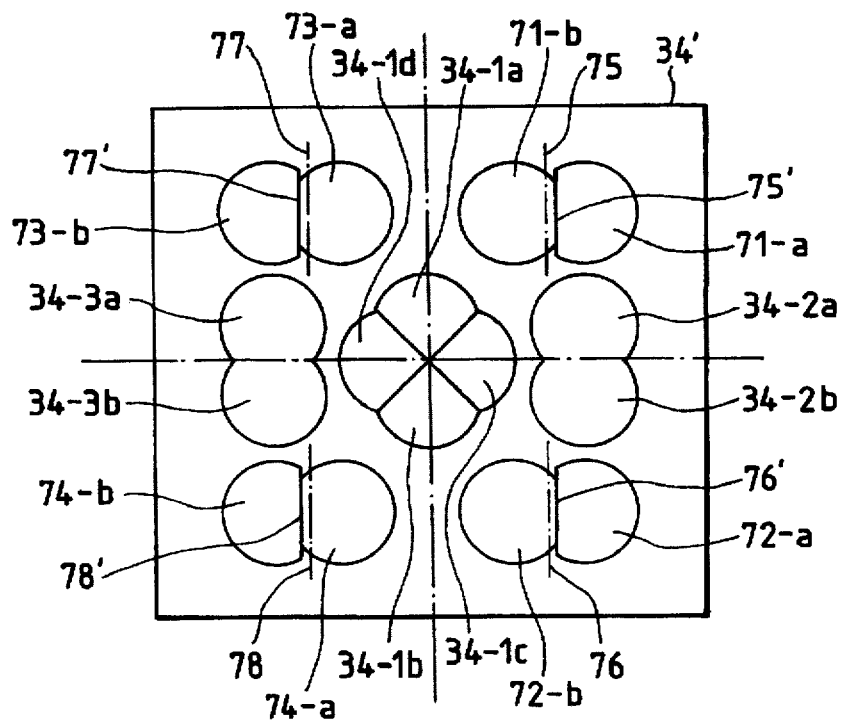
FIG. 3 is a front view of the secondary imaging optical member in Embodiment 1.

FIG. 2 shows only the secondary optical member 34' integrally including the secondary imaging lenses, shown in FIG. 1, and FIG. 3 is a plan view thereof. In these figures, elements having the same functions as those in FIG. 1 or FIG. 17 are denoted by the same reference numerals. As apparent from these figures, the lens pairs 34-1a and 34-1b, 34-1c and 34-1d, 34-2a and 34-2b, 34-3a and 34-3b are shaped in symmetry with each other with respect to a straight line or a plane perpendicular to a straight line connecting apexes of the respective lenses, whereas the lens pairs 71-a and 71-b, 72-a and 72-b, 73-a and 73-b, 74-a and 74-b according to the present embodiment have no such symmetry line or symmetry plane for the shapes. In more detail, it is presumably the most general arrangement that in FIG. 3 a border line between a lens pair 71-a and 71-b, 72-a and 72-b, 73-a and 73-b, 74-a and 74-b is arranged originally to be coincident with a center line 75, 76, 77, 78 present in a plane perpendicularly bisecting the line connecting the apexes of the respective lenses, similarly as in the conventional arrangement, but the present embodiment employs a border line for each lens pair located at a position 75', 76', 77', 78' shifted left or right away from the center, resulting in each lens pair having asymmetric shapes.

The reason why the imaging lens pairs are shaped in this manner is explained below, referring to FIG. 4.

Figure 4:
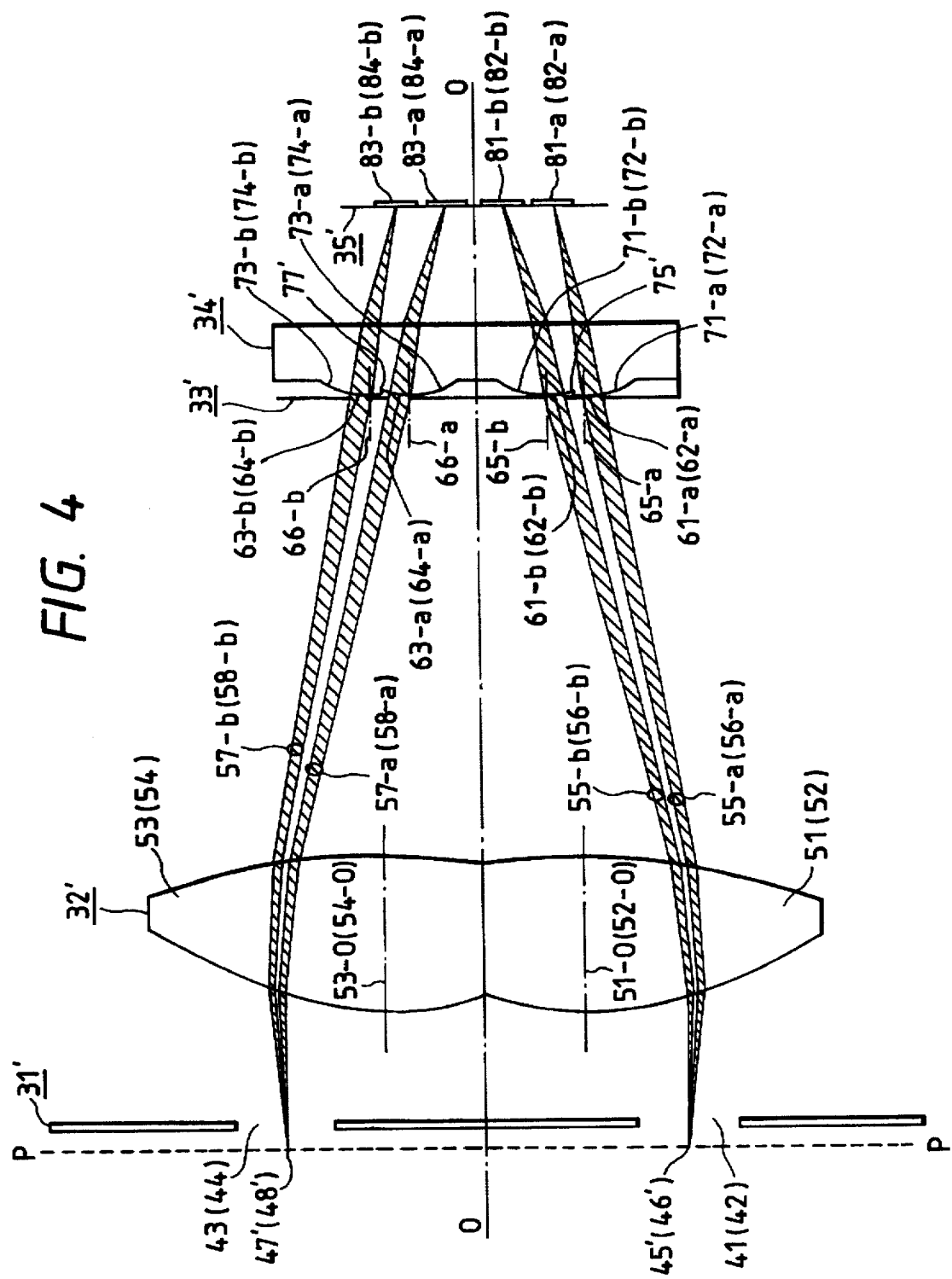
FIG. 4 is a projection onto a horizontal plane to show optical paths of the focus detecting system in Embodiment 1 of the present invention.

FIG. 4 is a plan view of the optical system in Embodiment 1. Here, FIG. 4 is a projection where only the elements concerning the offset apertures (distance-measuring fields) 41, 42, 43, 44 are observed from the top thereof, wherein the same elements as those in FIG. 1 are denoted by the same reference numerals. Strictly speaking, the position of the field mask 31' is slightly shifted away from the prescribed image plane PP of the objective, and therefore, the apertures in the field mask 31' are different from the distance-measuring fields. However, because the difference is small, they are regarded as being equal to each other, in the description.

Numerals 45', 46', 47', 48' represent the centers of the distance-measuring fields on the prescribed image plane of the objective, and 55-a and 55-b, 56-a and 56-b, 57-a and 57-b, 58-a and 58-b four pairs of distance-measuring beams passing the centers 45', 46', 47', 48' of the respective distance-measuring fields to form corresponding light quantity distributions on the sensor 35'.

The field lens 32' is composed of two parts 51, 53 or 52, 54, and optical axes thereof 51-O, 53-O, etc. are displaced in the plane of FIG. 4 and in the direction perpendicular to the plane of FIG. 4 with respect to the optical axis OO of the optical system. Generally, optical axes of two lens surfaces composing each area of the field lens 32' do not always have to coincide with each other, and do not have to be parallel to the optical axis OO. In order to maintain good optical characteristics, it is effective to form at least one out of a plurality of surfaces composing the field lens 32' so as to be an aspherical surface.

Requirements for the configuration of the optical system of the focus detecting apparatus shown in FIG. 4 are that the positions of the distance-measuring fields are determined to be as far from the optical axis OO as possible and that the total length of the optical system is made shorter to make compact the whole system, thereby facilitating assembling into a camera. From the point of the manufacturing cost, the percentage of the cost of sensor 35' is very high in the total cost. Thus, it is particularly effective to decrease the area of the sensor 35' in order to curtail the cost.

In order to realize an optimum optical system of the focus detecting apparatus in accordance with the above requirements, it is effective to raise the refracting power of the field lens 32' so as to converge the distance-measuring beams at large angles toward the sensor 35' after the beams leave the field lens 32', thereby letting the beams travel toward the stop 33' and secondary imaging optical member However, as an angle of incidence of each distance-measuring beam into the secondary imaging optical member 34' becomes larger, asymmetry increases as to relative relation between the distance-measuring beam and the imaging lens, as appearing between paired imaging lenses. This would raise the following problems if the optical system were constructed in the symmetry arrangement of the shapes of incident surfaces of the imaging lens pairs as in the conventional arrangement.

If the shapes of incident surfaces of lens pairs were made symmetric in FIG. 4, the border 75 between the lens 71-a and the lens 71-b would be shifted from the position 75' illustrated toward the lens 71-b, as shown in FIG. 3. Then, a part of the distance-measuring beam 55-b shown in FIG. 4 would impinge on the lens 71-a to be mixed in the distance-measuring beam 55-a. For each distance-measuring beam to pass through the associated imaging lens without mixture with the other beam in that case, the widths of the apertures 61-a and 61-b in the stop 33' need to be set smaller than those shown in FIG. 4, which would greatly lower the focus detecting performance for objects with low luminance. Additionally, there is a limit on fabrication to form such small apertures. Even though fabrication should be possible, it would be very disadvantageous with respect to machining accuracy and further with respect to the manufacturing cost.

Taking this point into account, the present invention realized a reasonable and an efficient optical system of the focus detecting apparatus in such an arrangement that, as shown in FIG. 2 to FIG. 4, the border between the imaging lens 71-a and the imaging lens 71-b is set at the border 75' offset toward the imaging lens 71-a and the border between the imaging lens 73-a and the imaging lens 73-b at the border 77' offset toward the lens 73-b, thereby making the shapes of incident surfaces of the imaging lens pairs asymmetric so as to avoid mixture of the distance-measuring beams. A cause of this problem is that the distance-measuring beams are incident in directions offset from the direction connecting the apexes of the paired imaging lenses. In the present embodiment, the incident surfaces of the paired lenses are different not only in the shape, but also in the effective area thereof from each other.

Employing the above shapes, substantially the same sizes are secured for the apertures in the stop 33' as those in the conventional cases, and thus, the conventional techniques may be employed for machining the stop.

In Embodiment 1, the aperture pairs 61-a and 61-b, 63-a and 63-b, etc., in the stop 33' are formed in the same shape, and a separation between the aperture pair 61-a and 61-b on the stop 33' is set nearly equal to a separation between the apexes of the imaging lenses 71-a and 71-b.

Figure 5:
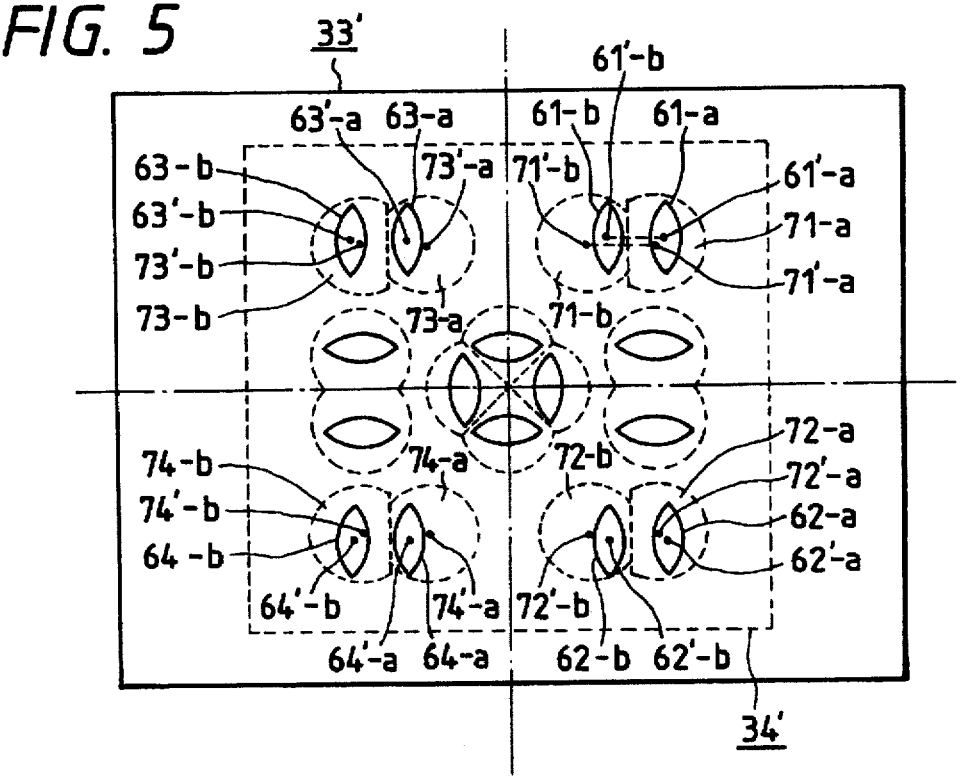
FIG. 5 is a front view of the stop and secondary imaging optical member according to Embodiment 2 of the present invention.

The field lens 32' may be placed immediately before the field mask 31', and the stop 33' may be located behind the secondary imaging optical member FIG. 5 is a front view of the stop and secondary imaging optical member according to Embodiment 2 of the present invention. Embodiment 2 is different from Embodiment 1 in the configuration of the imaging lenses composing the secondary imaging optical member 34', and is the same in the other respects. In the drawing, 61'-a, 61'-b, 62'-a, 62'-b, 63'-a, 63'-b, 64'-a, 64'-b denote centers of stop apertures 61-a, 61-b, 62-a, 62-b, 63-a, 63-b, 64-a, 64-b, respectively, and 71'-a, 71'-b, 72'-a, 72'-b, 73'-a, 73'-b, 74'-a, 74'-b apexes of the imaging lenses 71-a, 71-b, 72-a, 72-b, 73-a, 73-b, 74-a, 74-b, respectively.

As is apparent from FIG. 5, with respect to each center 61'-a, 61'-b, 62'-a, 62'-b, 63'-a, 63'-b, 64'-a, 64'-b of the stop aperture, each apex 71'-a, 71'-b, 72'-a, 72'-b, 73'-a, 73'-b, 74'-a, 74'-b of the imaging lens corresponding thereto is shifted toward the center in both the vertical and horizontal directions in the present embodiment. As described in the explanation of FIG. 4, it is necessary in order to decrease the total length of the optical system and to make compact the sensor 35' that each distance-measuring beam be incident at such a large angle as to converge toward the sensor 35' into the stop 33' or the secondary imaging optical member 34'. Embodiment 2 is a preferred arrangement of the stop 33' and secondary imaging optical member 34' to achieve this.

FIG. 5 shows the arrangement wherein the straight lines connecting the centers of the paired stop apertures, for example 61'-a and 61'-b, and the straight lines connecting the apexes of the similarly paired imaging lenses corresponding thereto, for example 71'-a and 71'-b, all are horizontal, but the present invention may involve such an arrangement that the positional relations of the centers of the paired stop apertures or the lens apexes are slightly shifted from the horizon in order to finely adjust a positional relation between two light quantity distributions formed on the sensor 35' or in order to balance the imaging performance.

As seen from FIG. 5, a distinct feature of the present embodiment is that relative positional relations between the centers of the paired two stop apertures and the apexes of the two imaging lenses corresponding thereto are different from each other. For example, explaining this with an example of the right upper part of FIG. 5, the relative positional relation between the center 61'-a of the stop aperture and the apex 71'-a of the imaging lens is different from the relative positional relation between the center 61'-b of the stop aperture as a counterpart of the pair and the lens apex 71'-b, and the latter is shifted more in the horizontal direction. The purpose of this is as follows. When the beams 55-a, 55-b largely inclined in the converging directions toward the sensor 35' as shown in FIG. 4 are made incident into the stop apertures 61-a, 61-b, inclination of the beam 55-b incident into the stop aperture 61-b located closer to the optical axis OO is greater than that of the other, and thus, the shift of the relative positional relation is set larger between the center 61'-b of the stop aperture and the apex 71'-b of the imaging lens, thereby balancing the imaging performance with respect to the distance-measuring beam incident into the stop aperture 61-a located more distant from the optical axis OO. This arrangement can relax the difference in the imaging performance between the two imaging lenses 71-a and 71-b originally having asymmetry, thus enabling the ability to improve the focus detecting accuracy.

Figure 6:
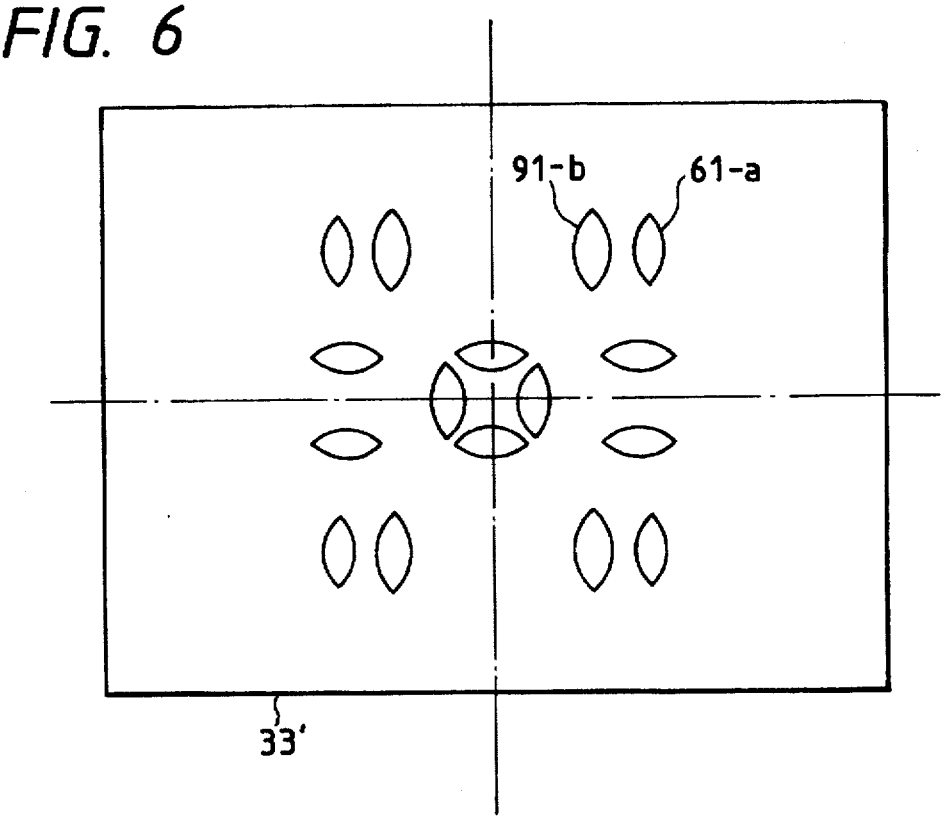
FIG. 6 is a front view of the stop according to Embodiment 3 of the present invention.

FIG. 6 is a front view of the stop according to Embodiment 3 of the present invention. The present embodiment concerns an improvement in the shape of the apertures in the stop 33' shown in FIG. 1. In the previous embodiments, a pair of stop apertures had the same size and shape, for example, as shown by 61-a, 61-b in FIG. 5. In contrast with it, the present embodiment is arranged in such a manner that the effective area and the aperture shape are made greater for the aperture 91-b closer to the center out of a pair of apertures, as shown in FIG. 6.

Generally, absolute light quantities in two light quantity distributions on the sensor 35' change depending upon the characteristics of the field lens 32' having the pupil imaging function, an angle of incidence of each distance-measuring beam from the objective, etc. Thus, it cannot unconditionally be judged which is large or small. There are, however, some cases where a difference occurs in light quantity between distance-measuring beams passing two apertures which are formed in the same size and shape in the stop 33'. It is essentially desirable in such cases to make the two apertures asymmetric with each other.

The present embodiment solved this problem by such a simple arrangement that the sizes of the paired stop apertures are made unequal to each other. This arrangement can control, in a designing manner, the difference concerning the light quantities in the two light quantity distributions formed on the sensor 35', thereby improving the focus detecting accuracy. The present embodiment is an example of the focus detecting apparatus where the light quantities of two distance-measuring beams are desired to be substantially equal to each other.

Figure 7:
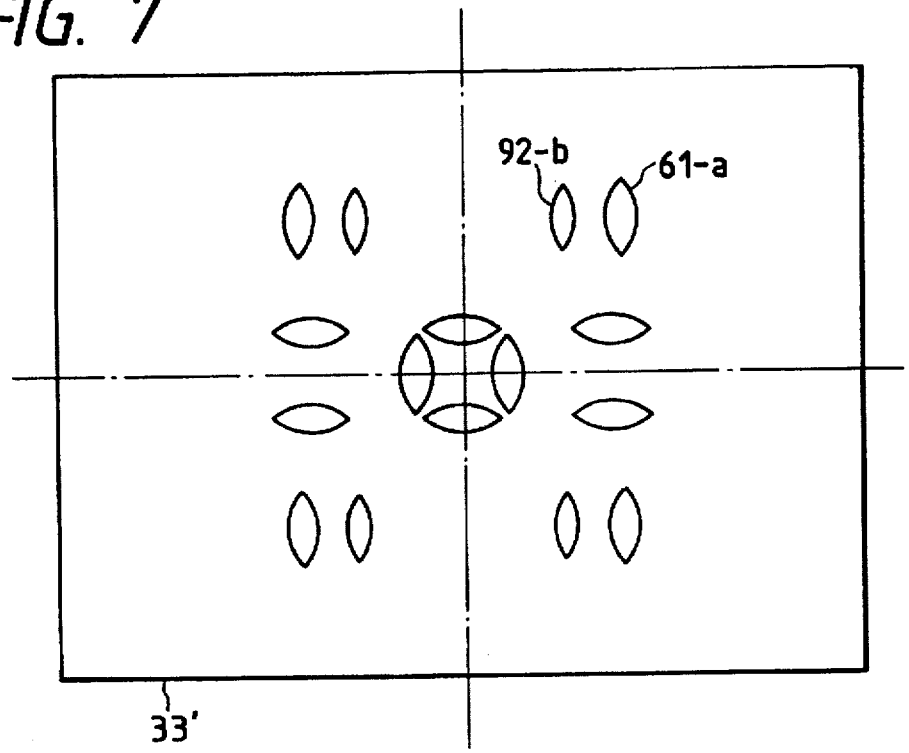
FIG. 7 is a front view of the stop according to Embodiment 4 of the present invention.

FIG. 7 is a front view of the stop according to Embodiment 4 of the present invention. Since the focus detecting apparatus of the present invention detects relative deviation between two light quantity distributions, an important factor is that distribution shapes of the two light quantity distributions are alike. An object of the present embodiment is to improve the similarity between the distribution shapes of the two light quantity distributions formed on a pair of light-receiving element arrays, and, opposite to Embodiment 3 of FIG. 6, the effective area and the aperture shape are made smaller for an aperture closer to the center out of a pair of apertures in the stop As seen from FIG. 4, the distance-measuring beam 55-b passing through the aperture closer to the center, for example, the aperture 61-b, out of a pair of apertures is subject to stronger deflection by the field lens 32' than the distance-measuring beam 55-a passing through the other aperture 61-a is, and thus, the optical path of the beam 55-b is bent greater. It is generally known that more degradation of imaging performance occurs with a stronger deflection of the field lens 32' in such an optical system. Thus, comparing the shapes of light quantity distributions of images which the two beams form on the sensor 35', they are not similar to each other, which will hinder focus detection.

The present embodiment eliminates the hindrance in such a manner that the stop aperture likely to be degraded in imaging performance, i.e., the aperture 61-b closer to the center is changed into an aperture 92-b smaller than the other aperture 61-a, as shown in FIG. 7, so as to increase the substantial F-number, thereby enhancing the imaging performance.

This arrangement does enhance the imaging performance of light quantity distributions and improves the similarity between the shapes of light quantity distributions, but there is a possibility that the difference between absolute light quantities in the light quantity distributions formed on the two light-receiving element arrays 81-a, 81-b as explained in Embodiment 3 is further enlarged. This problem can be overcome by arithmetic processing of output values from the sensor 35' to effect correction thereof.

The present embodiment also has an effect to solve the problem caused by a difference in performance of pupil imaging by the field lens 32' in addition to the decreasing effect of the difference in imaging performance on the sensor 35'.

This is next explained. It is known as to the focus detecting apparatus of the phase difference method, which the present invention is based on, that the focus detecting accuracy is degraded and an erroneous operation occurs when a light beam to be taken in by the optical system of the focus detecting apparatus is interrupted even in a small quantity by the objective lens. Accordingly, the stop of the optical system of the focus detecting apparatus needs to be set to be optimal in accordance with the aperture ratio of the objective. How many light beams can be taken in on that occasion greatly depends upon the performance of pupil imaging of the field lens 32'. The same discussion as applied to the imaging performance obtained on the above sensor 35' can be applied to the performance of pupil imaging of the field lens 32', and thus, a light beam subject to stronger deflection of the field lens 32' shows more degradation of performance of pupil imaging and becomes likely to be interrupted by the objective. It thus becomes desirable to make smaller the aperture of stop 33', for example, related to the distance-measuring beam 55-b. In that case, because the distance-measuring beam 55-a passing through the aperture 61-a as a counterpart of the pair is unlikely to be interrupted by the objective, the aperture therefor does not need to be made smaller. When the aperture pairs of the stop are made so as not to be the same, for example, when the aperture 61-a is made larger and the aperture 92-b is made smaller, as in the present embodiment, the arrangement can enjoy two effects, an improvement in similarity between the shapes of two light quantity distributions and securing sufficient distance-measuring light quantities by decreasing the possibility of light interruption by the objective.

Figure 8:
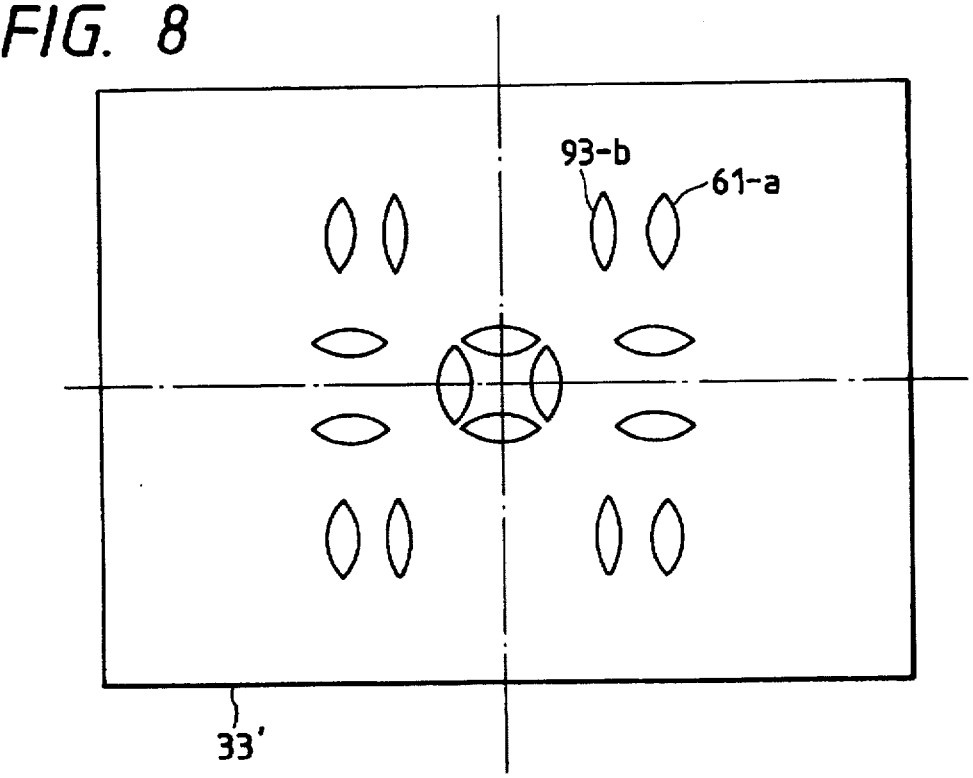
FIG. 8 is a front view of the stop according to Embodiment 5 of the present invention.

FIG. 8 is a front view of the stop according to Embodiment 5 of the present invention. Embodiment 4 had the problem that the difference in light quantities between two images on the sensor 35' increased as compared with the case using the stop shown in FIG. 5, whereas Embodiment 5 is improved in this respect. The lateral width of the aperture 93-b in the stop 33' is the same as that of the aperture 92-b in Embodiment 4, but the shape of the aperture is changed so as to decrease longitudinal curvature of the aperture, thereby increasing the area of the aperture. In the use of the aperture 93-b in Embodiment 5, the lateral F-number of the aperture influencing the imaging performance on the sensor 35' is the same as that of the aperture 92-b in Embodiment 4, and prevention of degradation of imaging performance on the sensor can be realized similarly as in Embodiment 4. On the other hand, the light quantity increases by the extent of the increase in the area of the aperture as compared with that in the case of using the aperture 92-b in Embodiment 4, whereby light quantities of two images can be made nearly equal to each other, thus solving the above problem.

Figure 9:
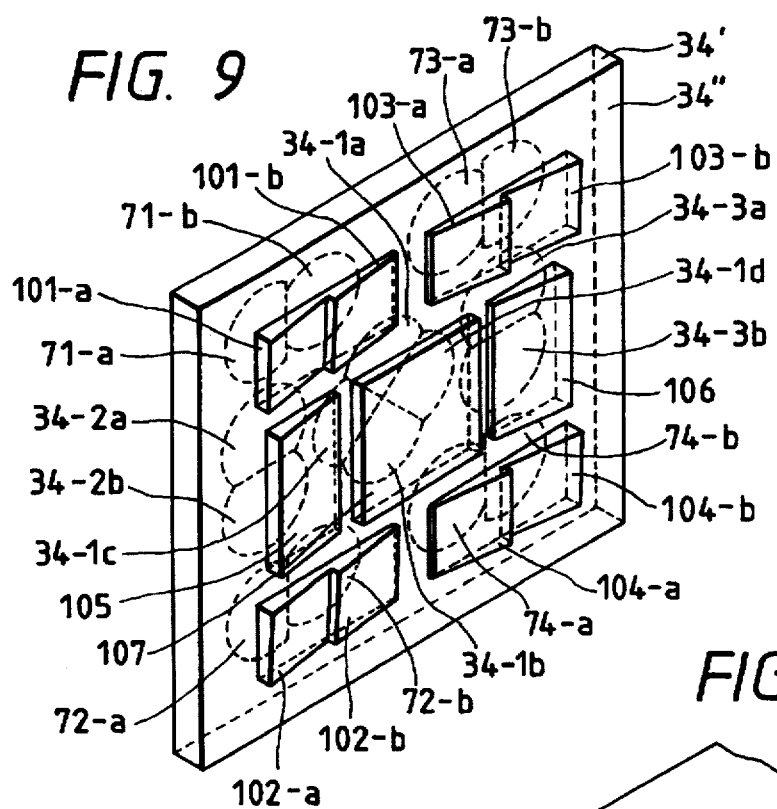
FIG. 9 is a perspective view to show an optical member according to Embodiment 6 of the present invention.

FIG. 9 is a perspective view of the secondary optical member 34' according to Embodiment 6 of the present invention, as observed from the exit side of the rays. In the drawing, there are four pairs of prism members 101-a and 101-b, 102-a and 102-b, 103-a and 103-b, 104-a and 104-b provided on the exit side of the secondary optical member 34' in correspondence to the four lens pairs 71-a and 71-b, 72-a and 72-b, 73-a and 73-b, 74-a and 74-b. These prism members are composed of inclined surfaces relative to the flat portion 34" of the secondary optical member 34', and each pair of prism members has a level difference from each other.

Prism members 105, 106 having inclination are provided in portions corresponding to the lens pairs 34-2a and 34-2b, 34-3a and 34-3b on the exit side of the secondary optical member 34', and a projecting member 107 is provided in a portion corresponding to the lens pairs 34-1a and 34-1b, 34-1c and 34-1d. Although FIG. 9 illustrates an arrangement in which these prism members and projecting member are isolated from each other on the secondary optical member 34' in order to clarify the shapes and locations thereof, this arrangement is not always essential. If the secondary optical member 34' is molded of a material such as a plastic, a good molded article can normally be obtained by rather employing an arrangement in which these members are in contact with each other and decreasing the inequality of the surface of the secondary optical member.

Figure 10:
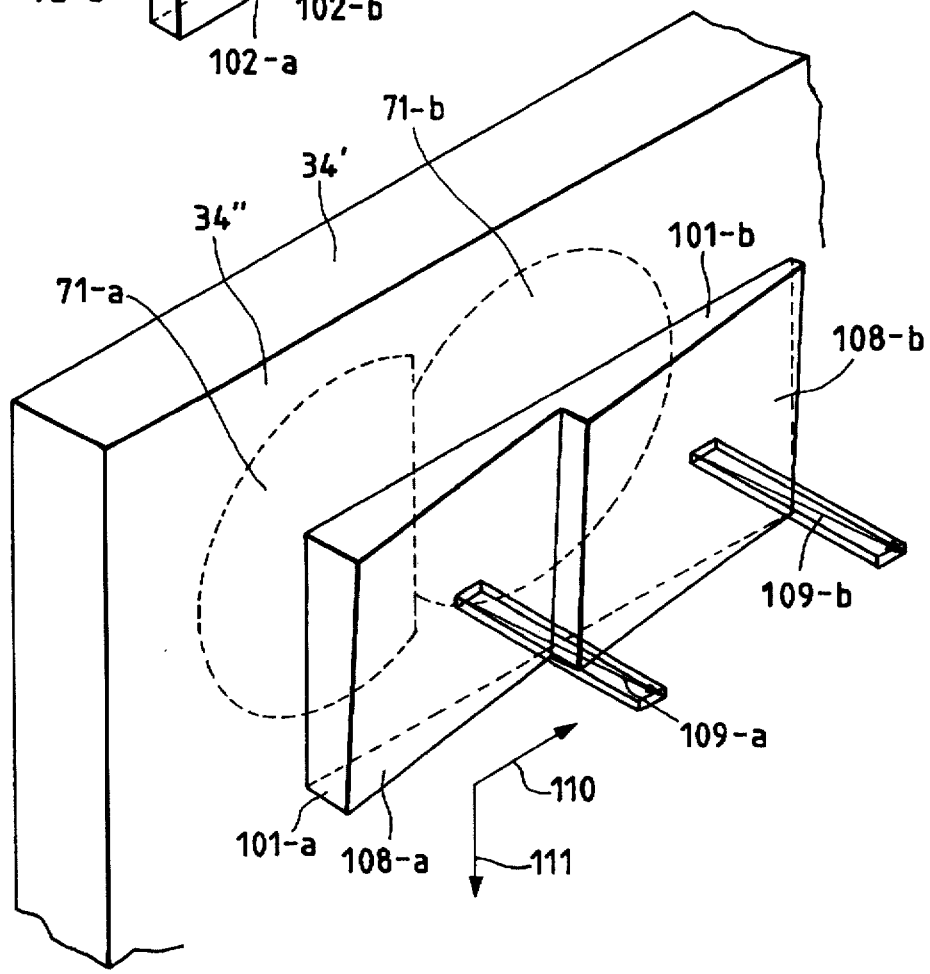
FIG. 10 is a partially enlarged view of the optical member shown in FIG. 9.

FIG. 10 is an enlarged view of only the prism members 101-a, 101-b shown in FIG. 9. As described previously, surfaces 108-a, 108-b forming the respective prism members are planes inclined relative to the flat portion 34" of the secondary optical member 34'. As is apparent from FIG. 10, these planes have two-directional inclination in the direction of the field (41 in FIG. 1) or the sensor arrays (81-a, 81-b in FIG. 1) related to the lens pair 71-a and 71-b and the prism pair 101-a and 101-b and in the direction perpendicular thereto. Namely, letting 109-a, 109-b be normal vectors to the planes 108-a, 108-b constituting the prism members 101-a, 101-b, respectively, these vectors have two components in the field direction 110 and the direction 111 perpendicular thereto.

Further, the planes 108-a, 108-b of the prism members 101-a, 101-b are not on the same plane, but have a level difference along the border between them. It is a matter of course that the planes 108-a, 108-b may be connected by a smoothly curved surface without forming the level difference as shown in FIG. 10 within the range not affecting the effective area, through which rays can pass, of the plane 108-a, 108-b of each prism member.

Here, the prism members 102-a, 102-b, 103-a, 103-b, 104-a, 104-b shown in FIG. 9, other than the prism members 101-a, 101-b shown in FIG. 10, are also composed of planes having similar inclination.

Figure 11:
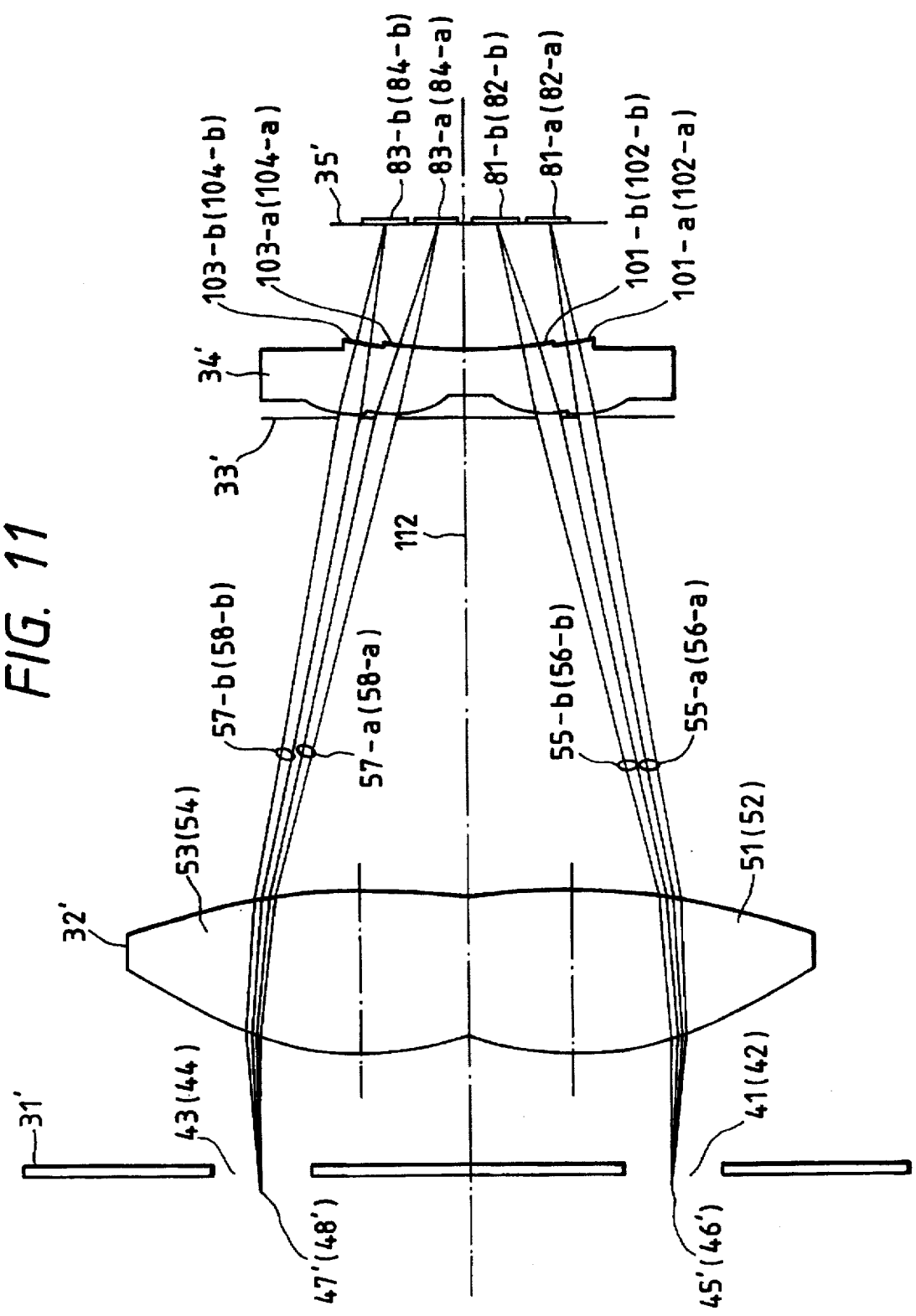
FIG. 11 is a projection onto a horizontal plane to show optical paths of the focus detecting system in Embodiment 6 of the present invention.
Figure 12:
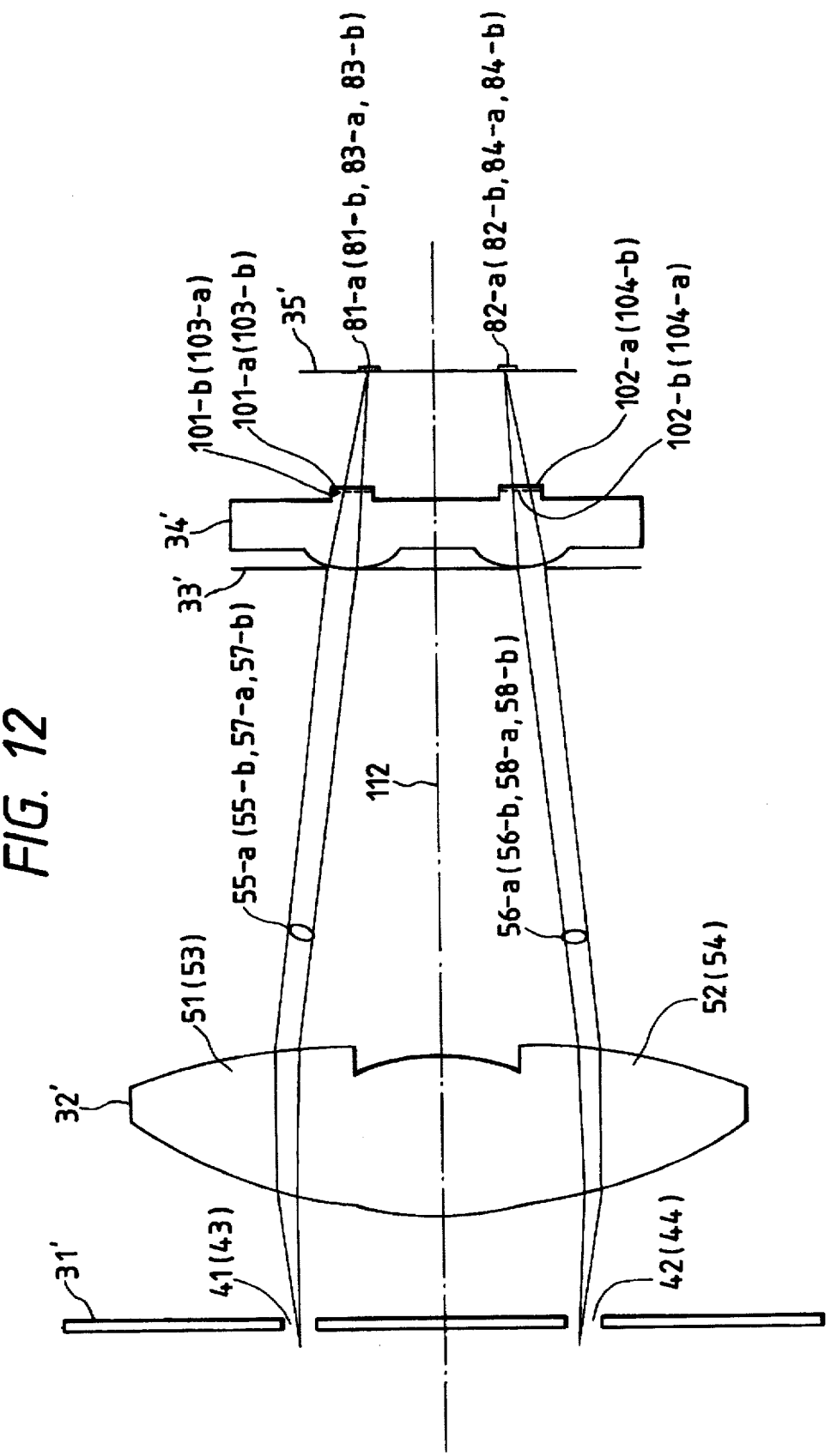
FIG. 12 is a projection onto a vertical plane to show optical paths of the focus detecting system in Embodiment 6 of the present invention.

The effect of the arrangement with such prism members is next explained referring to FIG. 11 and FIG. 12.

As described previously, a desired arrangement for realizing the optimum focus detecting system is that light beams of 55-a, 55-b, 57-a, 57-b, etc., are incident at large angles into the stop 33' or the secondary optical member 34' in FIG. 11 so as to converge toward the sensor; but, as an angle of incidence of each light beam into the secondary optical member 34' increases, an angle of an emerging light beam becomes larger relative to the secondary optical member, which would cause the light beams to have large angle changes due to refraction if the exit plane were a plane perpendicular to the optical axis 112. This would result in increasing various aberrations to degrade the imaging performance, such as astigmatism, coma, and chromatic aberration, and it becomes difficult to obtain image information for good focus detection.

In this respect, the present embodiment employs the inclined prism surfaces for the exit planes of the secondary optical member 34' as shown by 101-a, 101-b, 102-a, 102-b, 103-a, 103-b, 104-a, 104-b in FIG. 11, thereby suppressing occurrence of aberrations and enabling detection of good image information.

If a pair of prism surfaces were formed on the same plane, a difference in optical pathlength would become greater between paired light beams in the secondary optical member 34', which would make it difficult to form images in the same imaging performance on the same sensor surface. Thus, the present embodiment employs an arrangement in which the level difference is given between the paired prisms, as shown in FIG. 11, to change the thickness, thereby eliminating or relaxing the optical pathlength difference.

FIG. 12 is a projection of parts concerning the fields 41, 42 or 43, 44 in FIG. 1 onto a vertical plane, wherein the same elements are denoted by the same reference numerals. Namely, FIG. 12 corresponds to a view observed from below or above FIG. 11.

Also, in the projection of FIG. 12, the light beams 55-a, 55-b, 57-a, 57-b or 56-a, 56-b, 58-a, 58-b are incident obliquely into the secondary optical member 34', similarly as in the case of FIG. 11, and various aberrations as discussed above would occur if the exit planes of the member were formed as surfaces perpendicular to the optical axis 112. The exit planes in FIG. 12 are also formed as inclined prism surfaces accordingly. As a result, the prism members formed on the exit side of the secondary optical member 34' have normal vectors consisting of components in the field direction 110 and the direction 111 perpendicular to the field, as explained referring to FIG. 10.

It is conceivable that normal vectors of a pair of prism members are arranged to be directed in the same direction for simplicity, but it is not always necessary, as is apparent from the object and effect of the prism members in the present invention, and an optimum inclination may be set for each prism member.

Further, the previous embodiments showed examples in which the prism members were provided on the exit plane side of the secondary optical system, but the present invention is by no means limited to this arrangement. The object can also be achieved by an arrangement in which the prism members are provided on the entrance surface side of the secondary optical system and the lens surfaces having the imaging function are on the exit surface side. Further, the prism members do not have to be integrally formed, but separate lenses and prism members may be arranged in contact with each other.

Figure 13:
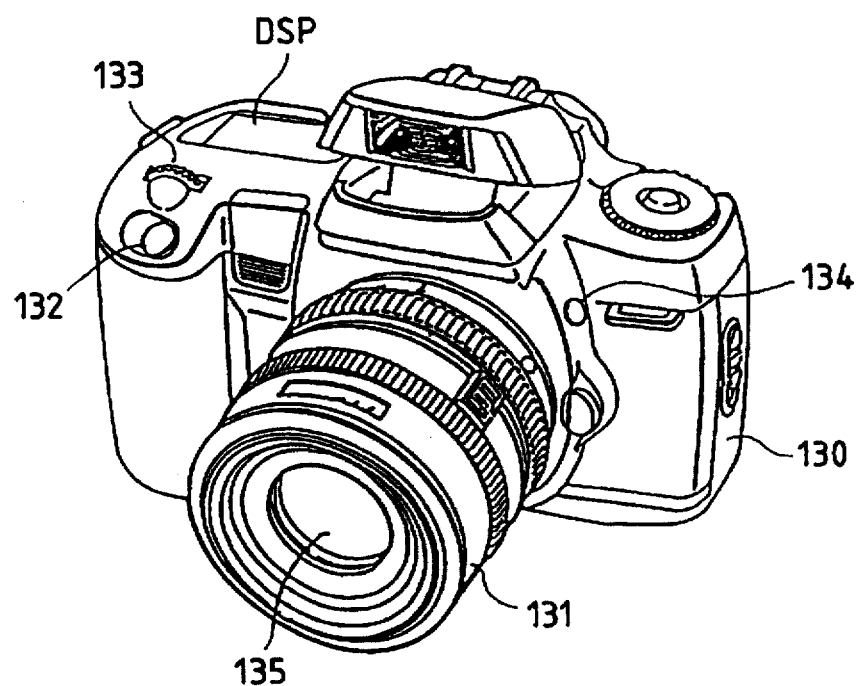
FIG. 13 is a perspective view of an entire camera having the focus detecting system of the present invention.
Figure 14:
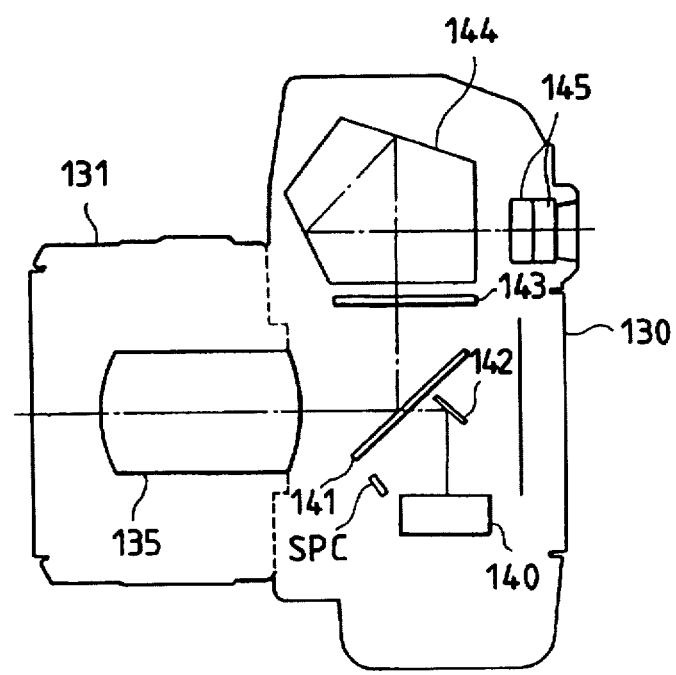
FIG. 14 is a sectional view of the optical system of the entire camera having the focus detecting system of the present invention.
Figure 15:
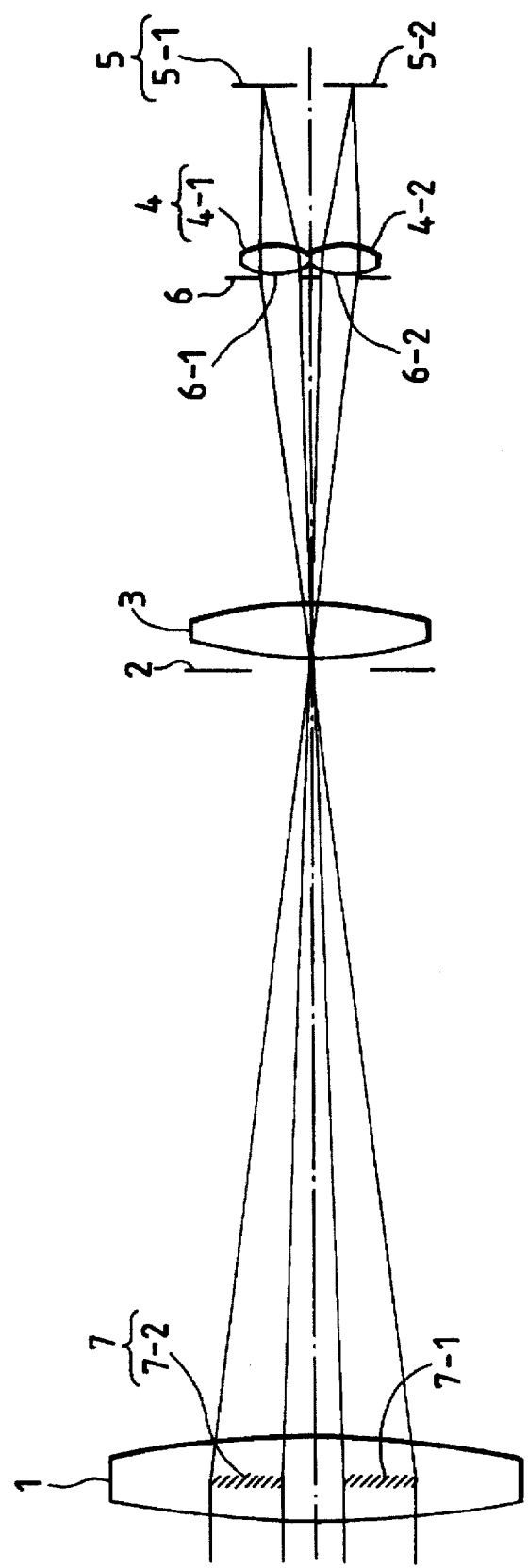
FIG. 15 is a drawing to illustrate a conventional example.
Figure 16:
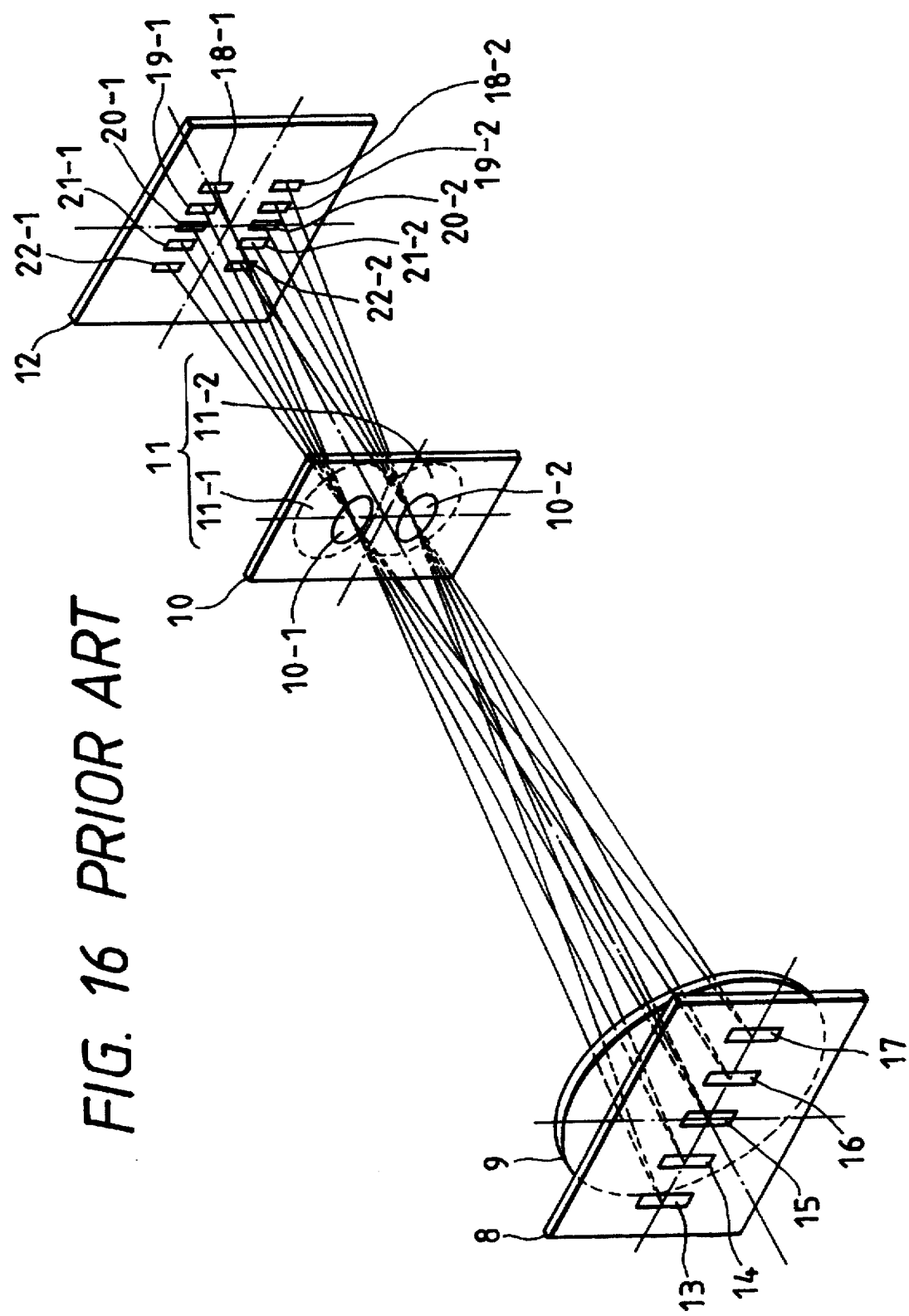
FIG. 16 is a drawing to illustrate another conventional example.

Next, FIG. 13 and FIG. 14 are perspective views to show an entire camera where the focus detecting apparatus of the present invention is applied to a single-lens reflex camera, and a sectional view of the optical system thereof, respectively.

In FIG. 13, reference numeral 130 designates a camera body, 131 a lens barrel for holding an objective lens 135 movable along the direction of the optical axis, 132 a shutter release button, 133 a setting dial capable of being manipulated by the right index finger, 134 a measuring field selection mode button capable of being manipulated by the left thumb, and DSP a liquid crystal display for providing various information to a photographer.

In FIG. 14, numeral 140 denotes the focus detecting apparatus of the present invention, which is illustrated in a unit form including the field mask and the elements after that in Embodiments 1–6. Numeral 141 represents a principal mirror, which separates light passing through the objective 135 into two beams traveling toward the focus detecting apparatus 140 and toward a finder system described below in cooperation with a sub-mirror 142. Numeral 143 is a focusing screen, 144 a pentagonal roof type prism, and 145 an eyepiece, which compose a finder system.

When the focus detecting apparatus as explained in Embodiments 1–6 is used in an optical apparatus such as a camera, as shown in FIG. 13 or 14, focus detection becomes possible at positions obliquely apart from the screen center.

What is claimed is:

1. A focus detecting apparatus for detecting a focal point of an object present at a position spaced obliquely from a center of a view field of an objective lens having a square-shaped view field, said focus detecting apparatus comprising:

a field mask disposed near a prescribed image plane of the objective lens and having an aperture provided at a predetermined position spaced in an oblique direction from the center of the view field of the objective lens for restricting a field area, said aperture extending in a direction along at least a side of the square-shaped view field;

a field lens also disposed near the prescribed image plane of the objective lens;

a pair of secondary imaging lenses corresponding to said aperture, for re-imaging an image formed by the objective lens;

a stop disposed adjacent to said pair of secondary imaging lenses and having a pair of apertures for restricting light passing through said pair of secondary imaging lenses; and a sensor for detecting light quantity distributions of images formed by said pair of secondary imaging lenses so as to detect a focal point by calculating a phase difference of the light quantity distributions, wherein when centers of the paired apertures on said stop and apexes of said pair of secondary imaging lenses corresponding to the paired apertures on said stop are projected onto a plane perpendicular to the optical axis of the objective lens, relative positional relations therebetween are not coincident with each other and are shifted in both directions of two sides orthogonal to each other of the square-shaped view field.

2. An optical apparatus comprising:

an objective lens having a square-shaped view field; and a focus detecting system for detecting a focal point of an object present at a position spaced in an oblique direction from a center of the view field of said objective lens, said focus detecting system comprising:

a field mask disposed near a prescribed image plane of said objective lens and having an aperture provided at a predetermined position spaced in an oblique direction from the center of the view field of said objective lens for restricting a field area, said aperture extending in a direction along at least a side of the square-shaped view field;

a field lens also disposed near the prescribed image plane of said objective lens;

a pair of secondary imaging lenses corresponding to said aperture, for re-imaging an image formed by said objective lens;

a stop disposed adjacent to said pair of secondary imaging lenses and having a pair of apertures for restricting light passing through said pair of secondary imaging lenses; and a sensor for detecting light quantity distributions of images formed by said pair of secondary imaging lenses so as to detect a focal point by calculating a phase difference of the light quantity distributions, wherein when centers of the paired apertures on said stop and apexes of said pair of secondary imaging lenses corresponding to the paired apertures on said stop are projected onto a plane perpendicular to the optical axis of said objective lens, relative positional relations therebetween are not coincident with each other and are shifted in both directions of two sides orthogonal to each other of the square-shaped view field.

3. A focus detecting apparatus comprising:

a field mask disposed near a prescribed image plane of an objective lens and having an aperture offset from the optical axis of the objective lens in order to restrict a field area;

a field lens also disposed near the prescribed image plane of the objective lens;

a pair of secondary imaging lenses corresponding to said aperture, for re-imaging an image formed by the objective lens;

a stop disposed adjacent to said pair of secondary imaging lenses and having a pair of apertures for restricting light passing through said pair of secondary imaging lenses; and a sensor for detecting light quantity distributions of images formed by said pair of secondary imaging lenses so as to detect a focal point by calculating a phase difference of the light quantity distributions, wherein the paired apertures on said stop corresponding to the aperture of said field mask have different areas from each other.

4. A focus detecting apparatus comprising:

a field mask disposed near a prescribed image plane of an objective lens and having an aperture offset from the optical axis of the objective lens in order to restrict a field area;

a field lens also disposed near the prescribed image plane of the objective lens;

a pair of secondary imaging lenses corresponding to said aperture, for re-imaging an image formed by the objective lens;

a stop disposed adjacent to said pair of secondary imaging lenses and having a pair of apertures for restricting light passing through said pair of secondary imaging lenses; and a sensor for detecting light quantity distributions of images formed by said pair of secondary imaging lenses so as to detect a focal point by calculating a phase different of the light quantity distributions, wherein the paired apertures on said stop corresponding to the aperture of said field mask have different shapes from each other.

5. A focus detecting apparatus for detecting a focal point of an object present at a position spaced in an oblique direction from a center of a view field of an objective lens having a square-shaped view field, said focus detecting apparatus comprising:

a field mask disposed near a prescribed image plane of the objective lens and having an aperture provided at a predetermined position spaced in an oblique direction from a center of the view field of the objective lens for restricting a field area, said aperture extending in a direction along at least a side of the square-shaped view field;

a field lens also disposed near the prescribed image plane of the objective lens;

a pair of secondary imaging lenses corresponding to said aperture, for re-imaging an image formed by the objective lens;

a stop disposed adjacent to said pair of secondary imaging lenses and having a pair of apertures for restricting light passing through said pair of secondary imaging lenses; and a sensor for detecting light quantity distributions of images formed by said pair of secondary imaging lenses so as to detect a focal point by calculating a phase difference of the light quantity distributions, wherein said secondary imaging lenses include an optical member for relaxing an optical path length difference between light beams passing through the respective lenses and for relaxing a change of angle due to refraction, of one of a beam of rays incident into each lens and a beam of rays emerging from each lens, and wherein said optical member is a prism member provided either on an entrance surface or on an exit surface of said pair of secondary imaging lenses, said prism member comprising a plane determined by a normal vector having components in a longitudinal direction of the aperture of said field mask and in a direction perpendicular to the longitudinal direction, in which regions of said prism member corresponding to the pair of secondary imaging lenses are not on the same plane.

6. An optical apparatus comprising:

an objective lens; and a focus detecting system which comprises:

a field mask disposed near a prescribed image plane of an objective lens and having an aperture offset from an optical axis of the objective lens in order to restrict a field area;

a field lens also disposed near the prescribed image plane of the objective lens;

a pair of secondary imaging lenses corresponding to said aperture, for re-imaging an image formed by the objective lens;

a stop disposed adjacent to said pair of secondary imaging lenses and having a pair of apertures for restricting light passing through said pair of secondary imaging lenses; and a sensor for detecting light quantity distributions of images formed by the pair of secondary imaging lenses so as to detect a focal point by calculating a phase difference of the light quantity distributions, wherein the paired apertures on said stop corresponding to the aperture of said field mask have different areas from each other.

7. An optical apparatus comprising:

an objective lens; and a focus detecting system which comprises:

a field mask disposed near a prescribed image plane of an objective lens and having an aperture offset from an optical axis of the objective lens in order to restrict a field area;

a field lens also disposed near the prescribed image plane of the objective lens;

a pair of secondary imaging lenses corresponding to said aperture, for re-imaging an image formed by the objective lens;

a stop disposed adjacent to said pair of secondary imaging lenses and having a pair of apertures for restricting light passing through said pair of secondary imaging lenses; and a sensor for detecting light quantity distributions of images formed by said pair of secondary imaging lenses so as to detect a focal point by calculating a phase difference of the light quantity distributions, wherein the paired apertures on said stop corresponding to the aperture of said field mask have different shapes from each other.

8. An optical apparatus including a square-shaped view field and a focus detecting system for detecting a focal point of an object present at a position spaced in an oblique direction from a center of the view field of an objective lens, said focus detecting system comprising:

a field mask disposed near a prescribed image plane of the objective lens and having an aperture provided at a predetermined position spaced in an oblique direction from the center of the view field of the objective lens for restricting a field area, said aperture extending in a direction along at least a side of the square-shaped view field;

a field lens also disposed near the prescribed image plane of the objective lens;

a pair of secondary imaging lenses corresponding to said aperture, for re-imaging an image formed by the objective lens;

a stop disposed adjacent to said pair of secondary imaging lenses and having a pair of apertures for restricting light passing through said pair of secondary imaging lenses; and a sensor for detecting light quantity distributions of images formed by said pair of secondary imaging lenses so as to detect a focal point by calculating a phase difference of the light quantity distributions, wherein said secondary imaging lenses include an optical member for relaxing an optical path length difference between light beams passing through the respective lenses and for relaxing a change of angle due to refraction, of one of a beam of rays incident into each lens and a beam of rays emerging from each lens, and wherein said optical member is a prism member provided either on an entrance surface or on an exit surface of said pair of secondary imaging lenses, said prism member comprising a plane determined by a normal vector having components in a longitudinal direction of the aperture of said field mask and in a direction perpendicular to the longitudinal direction, in which regions of said prism member corresponding to the pair of secondary imaging lenses are not on the same plane.

* * * * *

UNITED STATES PATENT AND TRADEMARK OFFICE
CERTIFICATE OF CORRECTION

PATENT NO. : 5,729,771

DATED : March 17, 1998

INVENTOR(S) : KEIJI OHTAKA

Page 1 of 2

It is certified that error appears in the above-identified patent and that said Letters Patent is hereby corrected as shown below:

ON THE COVER PAGE

At item [57], "ABSTRACT":
    line 9, "having" should read --has--;
    line 11, "A senor for detecting" should read --A sensor detects--; and
    line 12, "tity; distributions" should read --tity distributions--.

COLUMN 7:

line 28, "member" should read --member 34'.--.

COLUMN 8:

line 14, "member" should read --member 34'.--.

UNITED STATES PATENT AND TRADEMARK OFFICE
CERTIFICATE OF CORRECTION

PATENT NO. : 5,729,771

DATED : March 17, 1998

INVENTOR(S) : KEIJI OHTAKA

It is certified that error appears in the above-identified patent and that said Letters Patent is hereby corrected as shown below:

COLUMN 9:

line 53, "stop" should read --stop 33'.--.

COLUMN 12:

line 16, "pathlength" should read --path length--; and
    line 23, "pathlength" should read --path length--.

Signed and Sealed this

Seventeenth Day of November, 1998

Attest:

BRUCE LEHMAN

Attesting Officer      Commissioner of Patents and Trademarks